(12) United States Patent
Matsuba (10) Patent No.: US 7,952,734 B2
(45) Date of Patent: May 31, 2011

(54) IMAGE PROCESSOR UPDATING A MASTER FILE STORED IN A FILE SERVER, METHOD OF CONTROLLING THE SAME, AND A PROGRAM PRODUCT FOR PROCESSING IMAGES

(75) Inventor: Takafumi Matsuba, Itami (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1058 days.

(21) Appl. No.: 11/451,319

(22) Filed: Jun. 13, 2006

(65) Prior Publication Data

US 2007/0195357 A1 Aug. 23, 2007

(30) Foreign Application Priority Data

Feb. 23, 2006 (JP) .................... 2006-046867

(51) Int. Cl.
*G06F 3/12* (2006.01)
*G06F 15/00* (2006.01)
*G06K 1/00* (2006.01)

(52) U.S. Cl. .............. 358/1.15; 358/1.13; 358/1.14; 358/1.16; 358/1.17; 358/1.18

(58) Field of Classification Search .......... 358/1.1, 358/1.12–1.18; 705/26, 8; 1/1
See application file for complete search history.

(56) References Cited

U.S. PATENT DOCUMENTS

| 6,067,551 | A | * | 5/2000 | Brown et al. ................. 1/1 |
| 6,269,371 | B1 | | 7/2001 | Ohnishi |
| 6,782,402 | B1 | | 8/2004 | Hidaka et al. |
| 6,862,603 | B1 | | 3/2005 | Nakajima et al. |
| 6,862,604 | B1 | | 3/2005 | Spencer et al. |
| 6,945,717 | B2 | * | 9/2005 | Hata et al. ................. 400/76 |
| 7,068,386 | B2 | * | 6/2006 | Kawanabe ................ 358/1.15 |
| RE39,808 | E | * | 9/2007 | Motegi ..................... 358/1.14 |
| 7,535,583 | B2 | * | 5/2009 | Sesek et al. ................ 358/1.1 |
| 7,689,563 | B1 | * | 3/2010 | Jacobson ................... 707/663 |
| 2002/0026343 | A1 | * | 2/2002 | Duenke ......................... 705/8 |
| 2002/0156796 | A1 | * | 10/2002 | Hisamatsu et al. ........ 707/104.1 |
| 2003/0229546 | A1 | * | 12/2003 | Ho .............................. 705/26 |
| 2004/0012821 | A1 | | 1/2004 | Nakajima |
| 2004/0205534 | A1 | * | 10/2004 | Koelle ....................... 715/507 |
| 2005/0114339 | A1 | * | 5/2005 | Challener et al. ............ 707/10 |
| 2005/0117176 | A1 | * | 6/2005 | Benz et al. ................ 358/1.15 |

FOREIGN PATENT DOCUMENTS

| JP | 05-334161 | 12/1993 |
| JP | 09-146815 | 6/1997 |
| JP | 2002-169805 | 6/2002 |
| JP | 2003-324553 | 11/2003 |
| JP | 2004-178178 | 6/2004 |
| JP | 2005-204031 | 7/2005 |

OTHER PUBLICATIONS

Japanese Office Action mailed on Nov. 18, 2008 directed towards counterpart foreign application No. 2006-046867; 4 pages.

* cited by examiner

*Primary Examiner* — James A Thompson
*Assistant Examiner* — Satwant K Singh
(74) *Attorney, Agent, or Firm* — Morrison & Foerster LLP (57) ABSTRACT

In an image processor when a request is received to print a file then from received information the location information of the file for which the print request is issued is read. The image processor then performs a process in response to the request to update a file corresponding to the read location information to that for which the request is issued.

17 Claims, 9 Drawing Sheets

IMAGE PROCESSOR UPDATING A MASTER FILE STORED IN A FILE SERVER, METHOD OF CONTROLLING THE SAME, AND A PROGRAM PRODUCT FOR PROCESSING IMAGES

This application is based on Japanese Patent Application No. 2006-046867 filed with the Japan Patent Office on Feb. 23, 2006, the entire content of which is hereby incorporated by reference.

BACKGROUND OF THE INVENTION

1. Field of the Invention

The present invention relates generally to image processors and particularly to image processors used to timely update a master file stored in a file server in a file server system, methods of controlling the same, and program products for processing images.

2. Description of the Related Art

Conventionally there have been disclosed a variety of techniques relating to updating a file stored in a file server in a network file system.

For example, Japanese Laid-Open Patent Publication No. 05-334161 discloses that in a multi-server system including a plurality of file servers accessible from other computers, when a write request is received for a server the write is effected in the server and the server transmits update information and a write request identical in content to another server present in the system.

Furthermore, Japanese Laid-Open Patent Publication No. 09-146815 discloses that in a distributed file system a host computer receives updated data transferred from a distributed computer and uses its time tag to update a master file.

As disclosed in Japanese Laid-Open Patent Publication No. 05-334161, however, if a local computer has a file updated, and the user does not upload the file from the local computer to the file server, the updated content cannot be reflected in a master file stored in the file server.

As disclosed in Japanese Laid-Open Patent Publication No. 09-146815, in contrast, updated content of a file in a distributed computer can be reflected in a master file in real time. This, however, places an excessive burden on a file server (or a host computer) that must constantly monitor how the file in the distributed computer is updated.

SUMMARY OF THE INVENTION

The present invention has been made to overcome such disadvantages and it contemplates an image processor that can reduce a burden on a file server and also reflect in a master file stored in the file server an updated content of a file located in a local computer, a method of controlling the same, and a program product for processing images.

The present invention provides an image processor connected and capable of processing a file. The image processor includes a receiver receiving a print request issued to print a file; a reader reading location information of the file for which the print request is issued that is received by the receiver; an accessor accessing a file corresponding to the location information; and an updater operating in response to the print request to perform a process to update the file corresponding to the location information to the file for which the print request is issued that is received by the receiver.

The present invention also provides a program product for controlling an image processor connected and capable of printing a file. The program product causes the image processor to perform the steps of: receiving a print request issued to print a file; reading location information of the file for which the print request is issued that is received in the step of receiving; accessing a file corresponding to the location information; and updating, performing a process in response to the print request to update the file corresponding to the location information to the file for which the print request is issued that is received in the step of receiving.

The present invention also provides a method of controlling an image processor connected and capable of printing a file. The method includes the steps of receiving a print request issued to print a file; reading location information of the file for which the print request is issued that is received in the step of receiving; accessing a file corresponding to the location information; and updating, performing a process in response to the print request to update the file corresponding to the location information to the file for which the print request is issued that is received in the step of receiving.

In accordance with the present invention the image processor can update a master file present in a file server (or a file corresponding to location information of a file for which a request is issued to print it) to a file subjected to a printing process when the former file undergoes the printing process in a local computer.

The master file in the file server can thus be updated only when the file is printed at a local computer. This can reduce a burden on the file server. Furthermore, the printing of the file is a process performed when the file is updated in the local computer to some extent. This ensures that how the file in the local computer is updated is reflected in the master file stored in the file server.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter reference will be made to the drawings to describe an embodiment of the present invention.

Figure 1:
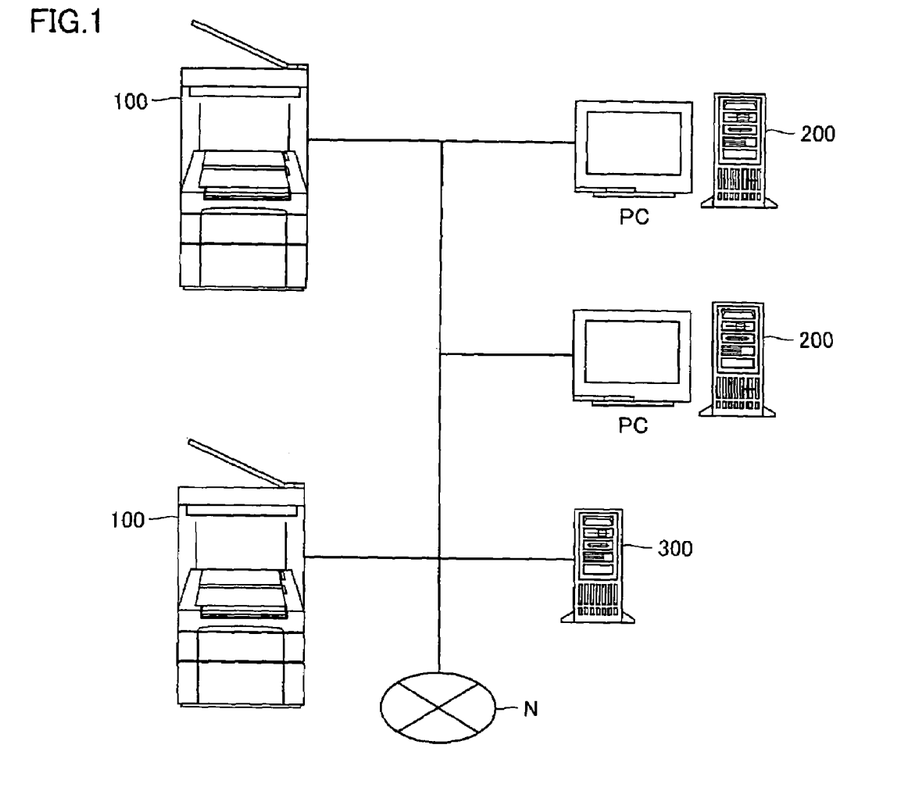
FIG. 1 schematically shows a configuration of a file system including multifunction peripherals (UP) corresponding to one embodiment of the present image processor.

FIG. 1 schematically shows a configuration of a file system including an MFP corresponding to one embodiment of the present image processor.

With reference to FIG. 1, the file system includes two MFPs 100 and two PCs 200, and a file server 300. MFPs 100, PCs 200 and server 300 are connected to a network and the network is connected to an internet N. The number of MFPs and other equipment as shown in FIG. 1 is merely one example and the number of each equipment configuring the file system is not limited to that shown in FIG. 1.

Figure 2:
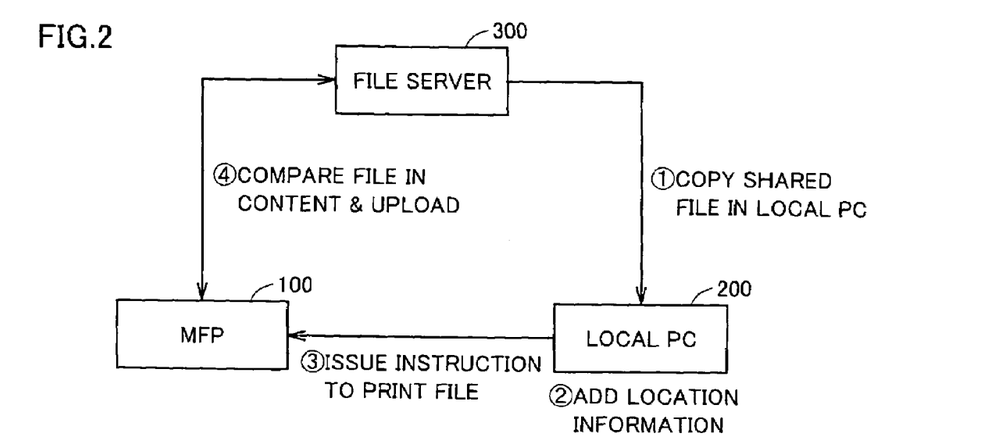
FIG. 2 schematically represents how information flows in the file system of FIG. 1 between components.

FIG. 2 schematically shows how in the file system of FIG. 1 each equipment communicates information with each other. With reference to FIG. 2, the information generally flows in the file system of the present embodiment, as will be described hereinafter.

Initially in PC 200 a shared file stored in file server 300 is copied. A shared file is a file of those stored in file server 300 that has information that permits sharing with another equipment in the file system.

Subsequently in PC 200 location information is added to the copied file. The location information is information indicating where an original file is stored. More specifically, it is information specifying equipment having had the original file stored therein (or file server 300), and information indicating where in the equipment (or file server 300) the original file is stored.

Then after in PC 200 the copied file is edited as required, a request is output to MFP 100 to print the file to instruct that the file be printed.

In response, MFP 100 effects a process to print the file and also, in accordance with the location information of the file, accesses the original file stored in file server 300 to compare the file for which the print request is issued with the original file, as required, and update the original file to the file for which the print request is issued.

Figure 3:
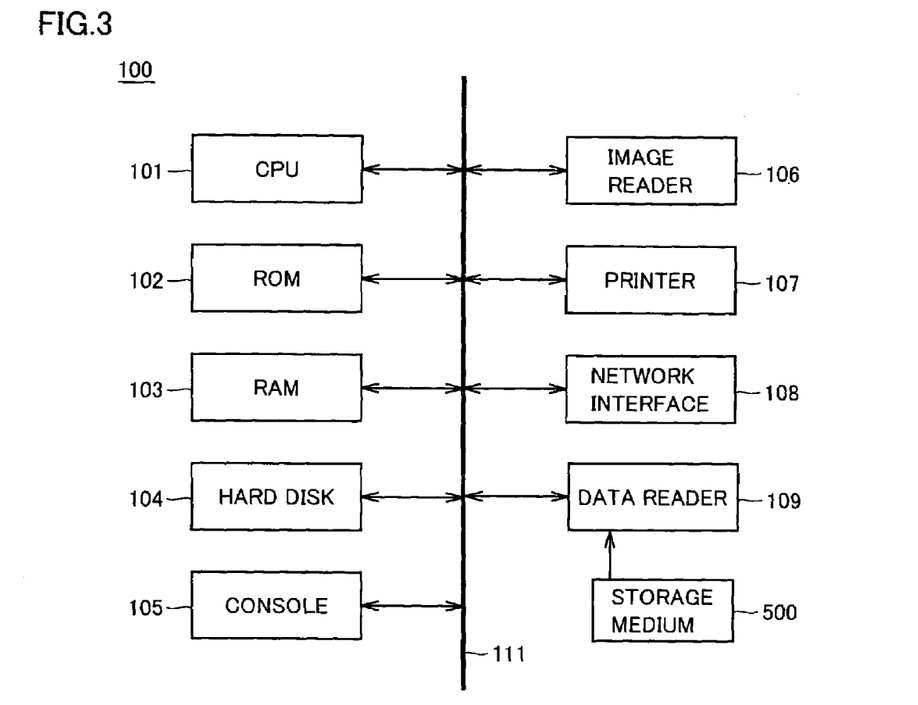
FIG. 3 shows a configuration in hardware of the MFP of FIG. 1.

FIG. 3 shows a configuration in hardware of MFP 100 of FIG. 1.

MFP 100 is equipped with a function printing in accordance for example with an instruction received from PC 200, a function allowing an original to be copied, and a function scanning an original to read and transmit image data. More specifically, MFP 100 includes a central processing unit (CPU) 101 generally controlling MFP 100, a read only memory (ROM) 102 storing a program, a constant and the like, a random access memory (RAM) 103 temporarily storing data, a hard disk 104 storing image data and the like, a console 105 operated by a user to receive his/her instructions, an image reader 106 that has a charge coupled device (CCD) or a similar photoreceptor photoelectrically converting light reflected by an original illuminated by a source of light and obtains image data of the original, a printer 107 employing an electrophotographic process or a similar, well-known process to print the image data on a sheet, a network interface 108 controlling communications with other equipment on a network, and a data reader 109 reading data recorded in a compact disk read only memory (CD-ROM) or a similar storage medium 500 detachably attachable to MFP 100. Console 105 includes a screen displaying for the user a state of MFP 100, command options and the like, and a key for input. The screen and the key may be implemented by a liquid crystal display and a touch panel placed thereon.

Figure 4:
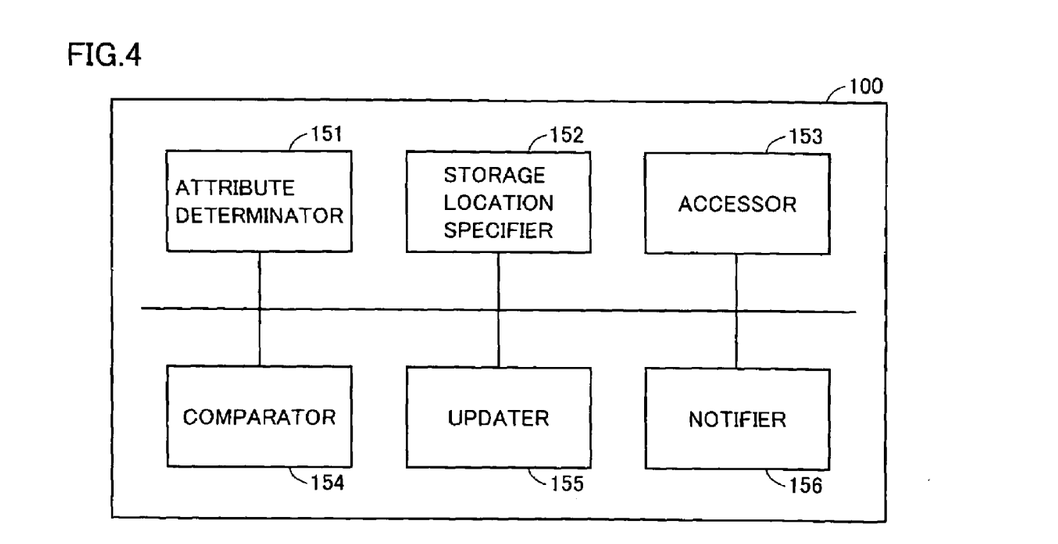
FIG. 4 is a functional block diagram of the MFP of FIG. 1.

FIG. 4 is a functional block diagram of MFP 100.

MFP 100 includes an attribute determinator 151 determining an attribute of a file for which a print request is issued (hereinafter referred to as a "file to be printed") (or whether the file may be shared or not), a storage location specifier specifying the location at which a master file (an original file described above) of the file to be printed is stored, an accessor 153 accessing a file stored at a location as specified by storage location specifier 152, a comparator 154 comparing in content the file to be printed with that stored at the location specified by storage location specifier 152, an updater 155 updating the master file to that to be printed, and a notifier 156 providing notification, which will be described later, to a user. Attribute determinator 151, storage location specifier 152 and comparator 154 are implemented by CPU 101 executing an appropriate program. Furthermore, accessor 153, updater 155 and notifier 156 are implemented by CPU 101 executing an appropriate program and utilizing network interface 108, as appropriate. Note that CPU 101 executes a program stored in ROM 102 or storage medium 500.

Figure 5:
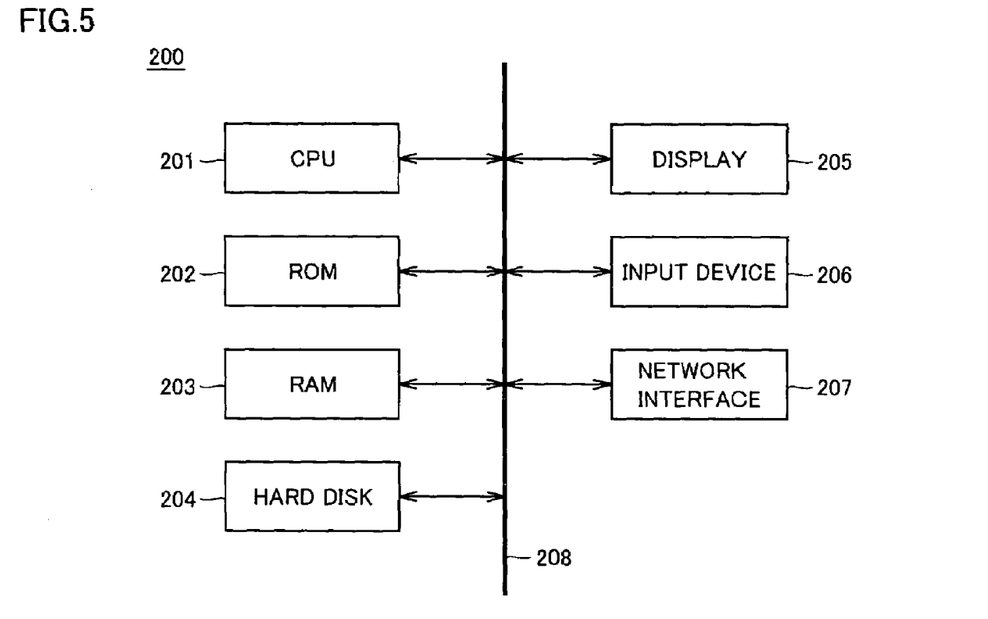
FIG. 5 shows a configuration in hardware of a personal computer (PC) of FIG. 1.

FIG. 5 is a block diagram showing a configuration in hardware of PC 200 shown in FIG. 1. Furthermore FIG. 6 is a block diagram showing a configuration in hardware of file server 300 shown in FIG. 1.

With reference to FIG. 5, PC 200 includes a CPU 201 generally controlling PC 200, a ROM 202 storing a program, a constant and the like, a RAM 203 temporarily storing data, a hard disk 204 storing image data and the like, a display 205 displaying information, an input device 206 operated by a user to receive his/her instructions, and a network interface 207 controlling communications with other equipment on the network.

Figure 6:
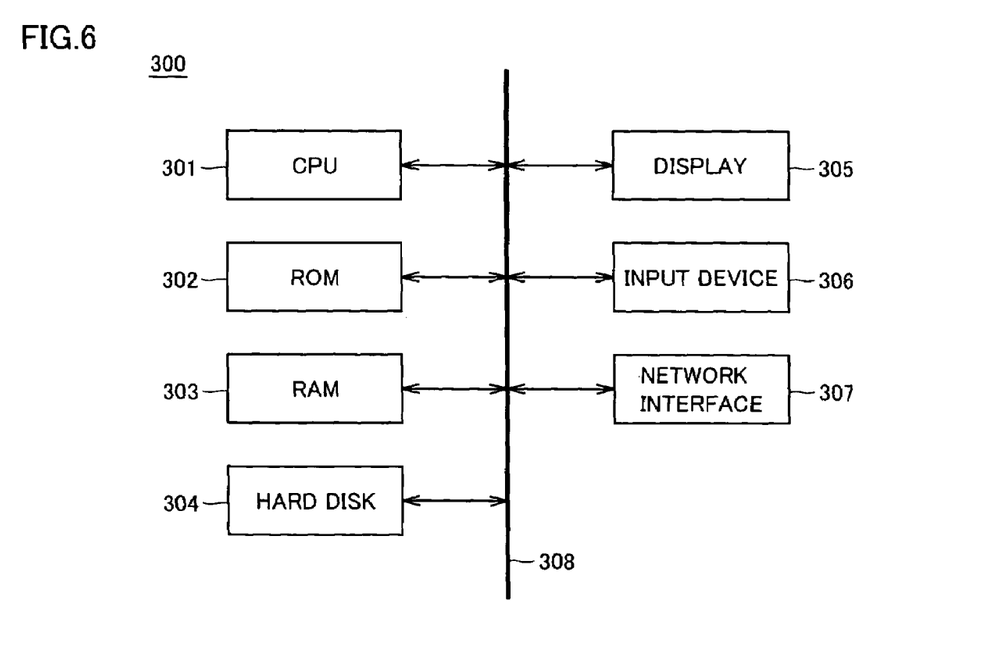
FIG. 6 shows a configuration in hardware of a file server shown in FIG. 1.

With reference to FIG. 6, as well as PC 200, file server 300 includes a CPU 301, a ROM 302, a RAM 303, a hard disk 304, a display 305, an input device 306, and a network interface 307.

Figure 7:
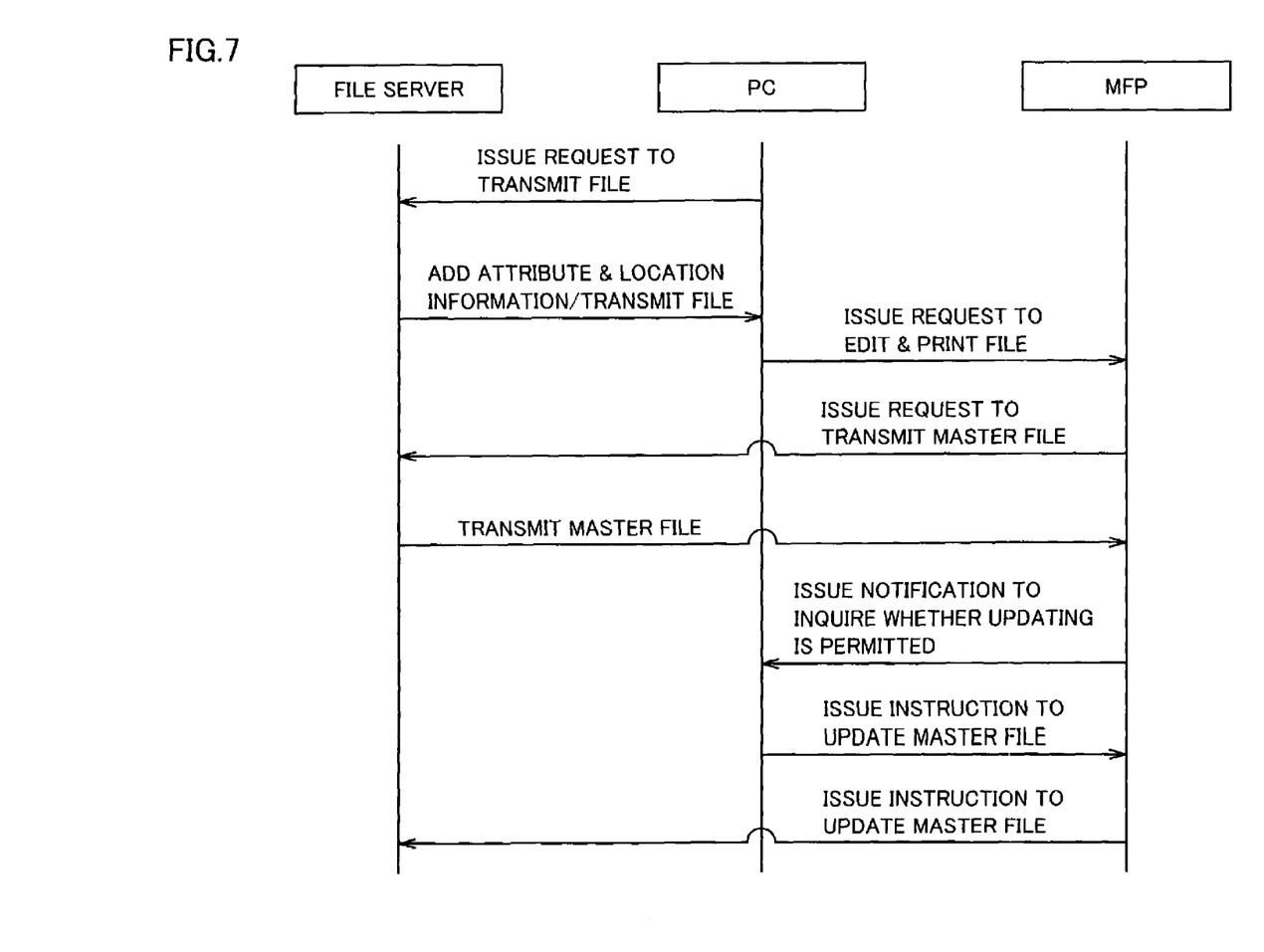
FIG. 7 specifically represents how a process flows in the file system of FIG. 1 between components.

FIG. 7 specifically shows a process flows in the file system of the present embodiment between MFP 100, PC 200 and file server 300.

With reference to FIG. 7, initially from PC 200 to file server 300 a request is issued to transmit a file. In response, the requested file is transmitted from file server 300 to PC 200 such that the file has added thereto its attribute information (i.e., information indicating whether it may be shared or not, and the like) and information that specifies where in file server 300 the file is stored (i.e., location information).

In PC 200 an operation is performed, as required to edit the received file, and thereafter a request is issued to MFP 100 to print the file.

In response, MFP 100 issues a request to file server 300, as based on the location information added to the file to be printed, to transmit a master file of the file to be printed.

In response, file server 300 transmits to MFP 100 the master file of the file to be printed.

In response, MFP 100 compares the file to be printed with the master file and if there is a difference therebetween in content then MFP 100 issues notification to PC 200 that has output the print request as to whether updating is permitted or not.

In response to the notification, PC 200 urges the user to input information of whether updating is permitted or not, and in response to the user's specific input, outputs an instruction to MFP 100.

If MFP 100 receives from PC 200 an instruction indicating that updating is permitted, the master file stored in file server 300 is updated to that to be printed.

Figure 8:
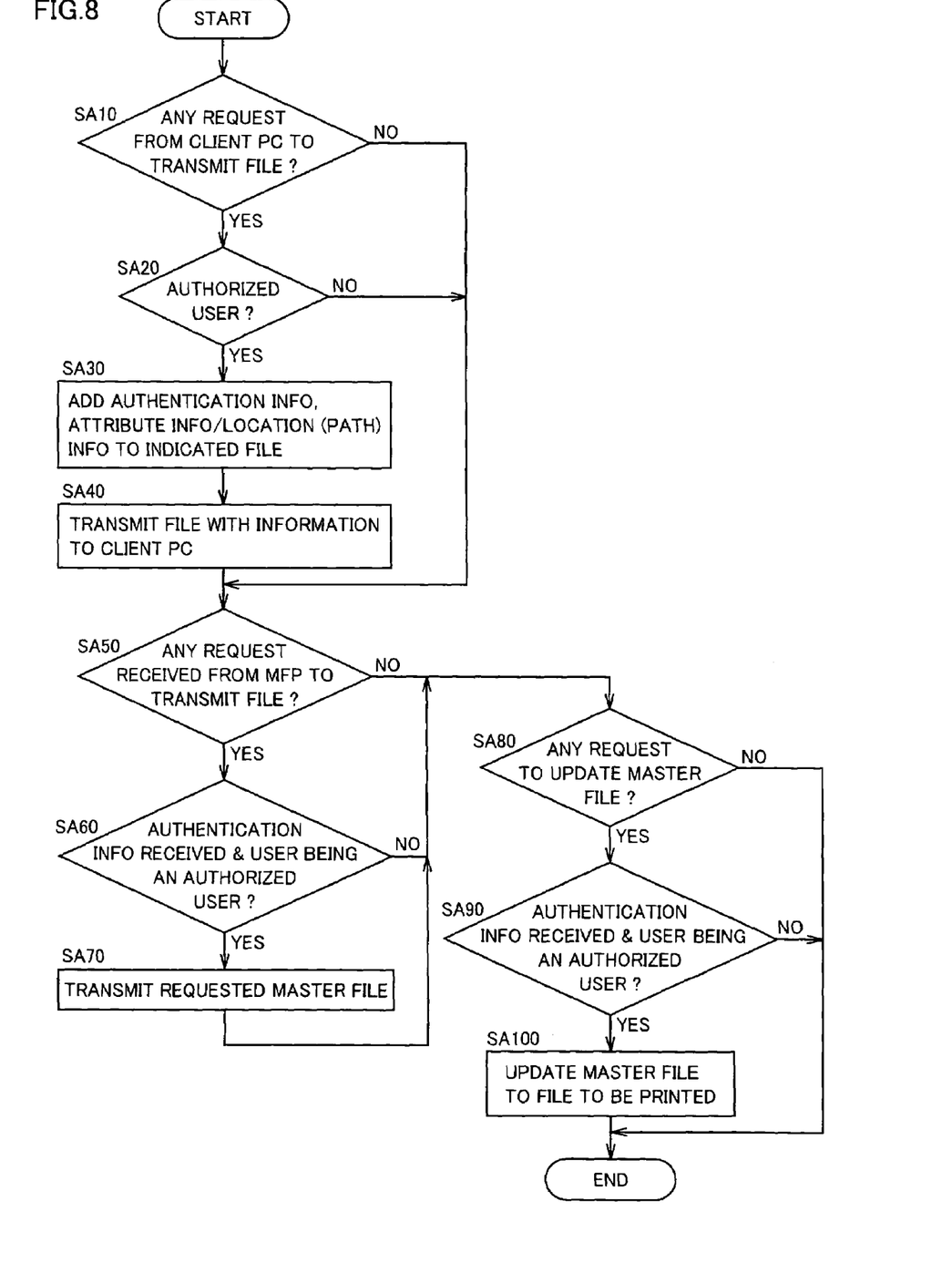
FIG. 8 is a flow chart of a process performed in the file server of FIG. 1.
Figure 9:
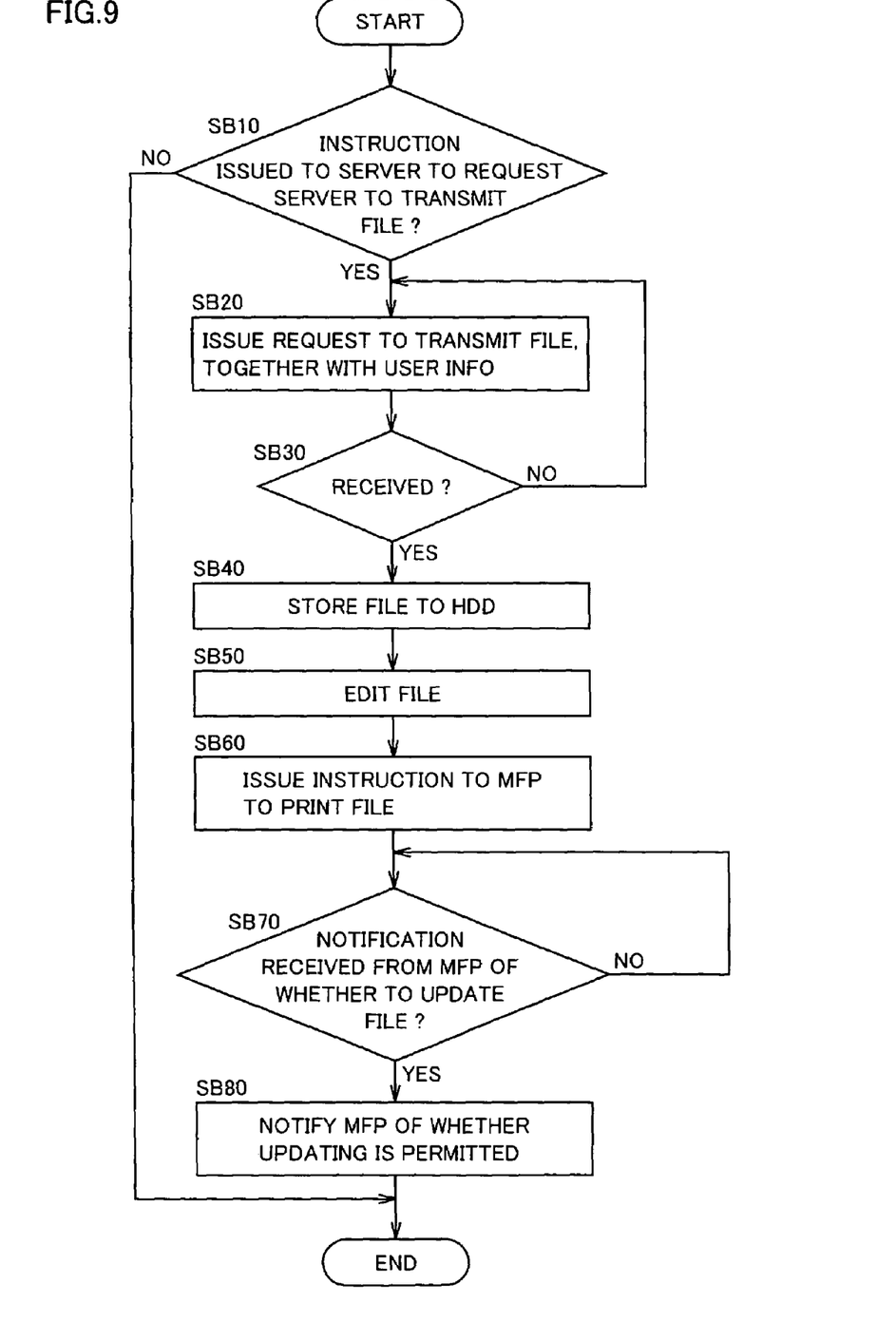
FIG. 9 is a flow chart of a process performed in the PC of FIG. 1.
Figure 10:
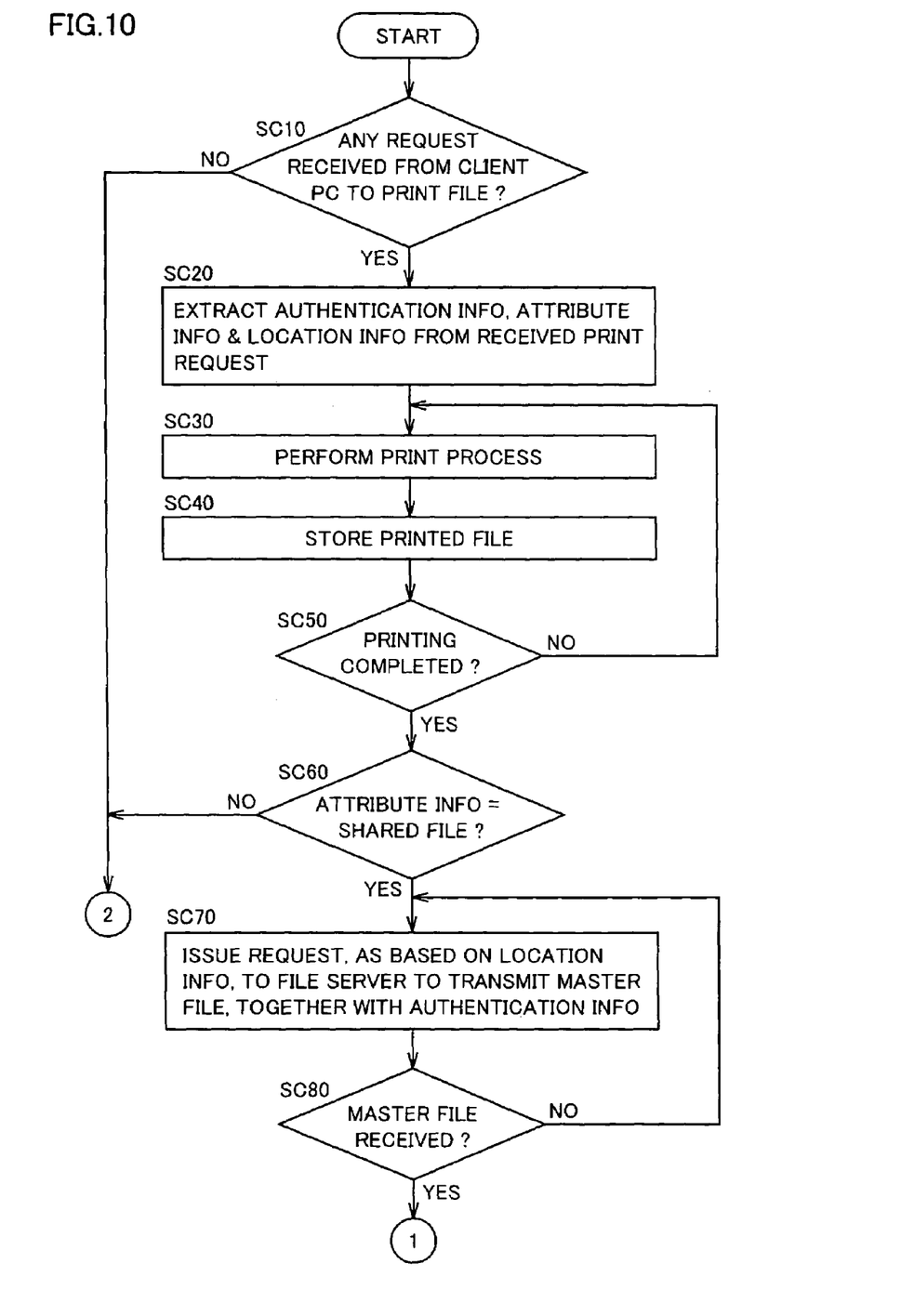
FIG. 10 is a flow chart of a process performed in the MFP of FIG. 1.
Figure 11:
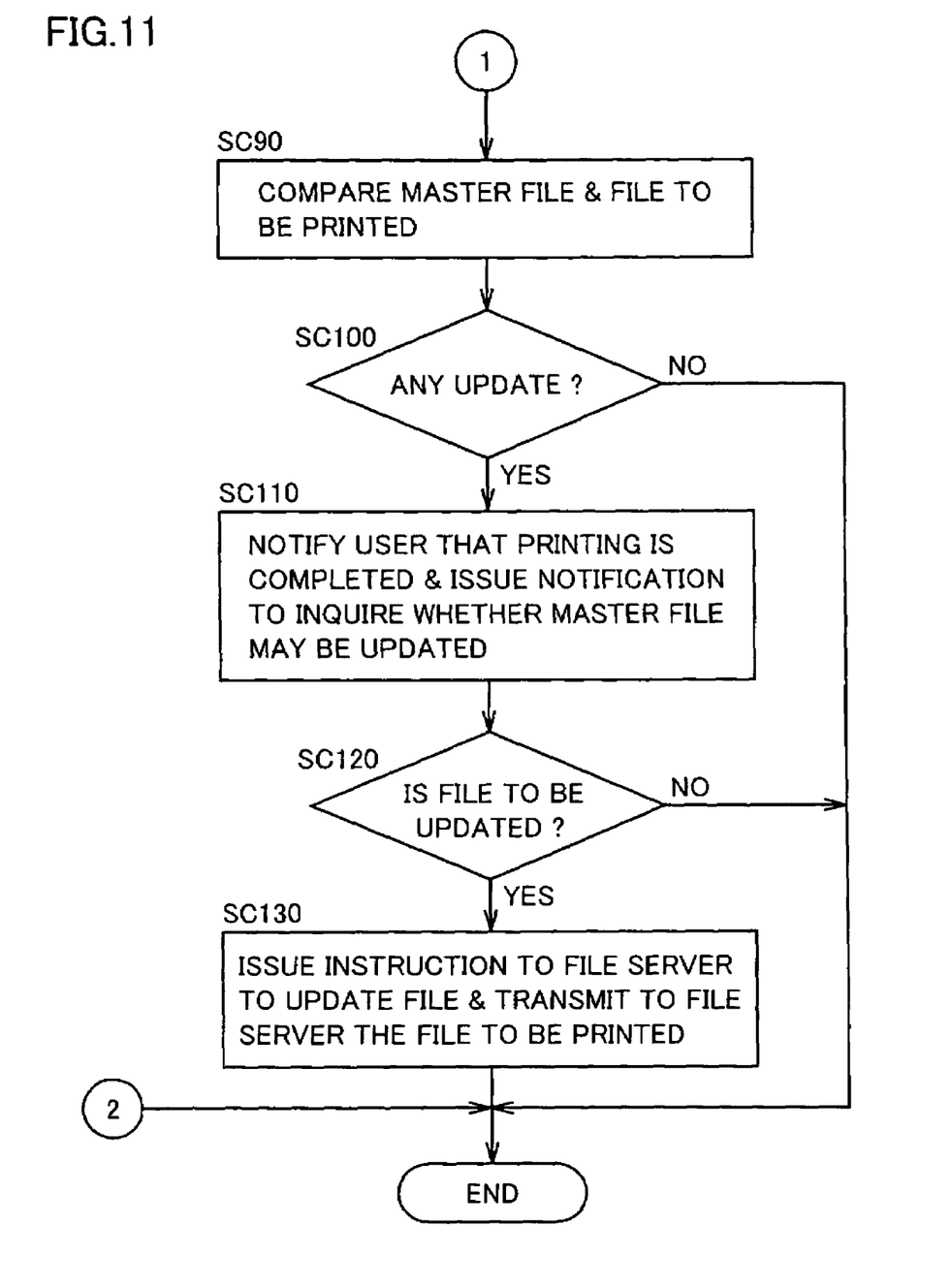
FIG. 11 is a flow chart of a process performed in the MFP of FIG. 1.

In the file system of the present invention as described above, a process is performed, as will now be more specifically described with reference to FIGS. 8-11 by describing a process performed at each equipment. Note that FIG. 8 is a flow chart of a process performed by CPU 301 of file server 300. FIG. 9 is a flow chart of a process performed by CPU 201 of PC 200. FIGS. 10 and 11 are a flow chart of a process performed by CPU 101 of MFP 100.

Initially, with reference to FIG. 9, if in the process performed in PC 200 by CPU 201 at step SB 10 CPU 201 determines that information indicating that transmission of a file from file server 300 is requested is received from a user, the process proceeds to step SB20 to output a request to file server 300 to transmit the file, and user information together with the request.

Then, with reference to FIG. 8, if in the file server CPU 301 determines in step SA10 that the request to transmit the file is received from PC 200, CPU 301 proceeds to step SA20 to determine from the user information whether the request is that issued from an authorized user. If so CPU 301 proceeds to step SA30. If CPU 301 determines that the request is issued from an unauthorized user, CPU 301 proceeds to step SA50.

In step SA30 CPU 301 adds authentication information (the user information output at step SB20), attribute information, and location information (a location in hard disk 304 for storage) to the file indicated by the request to be transmitted, and proceeds to step SA40.

In step SA40 CPU 301 transmits the file having the variety of information added thereto at step SA30 to PC 200 having transmitted the request to transmit the file, and proceeds to step SA50.

With reference again to FIG. 9, CPU 201 determines in step SB30 whether the file has been received. If so CPU 201 proceeds to step SB40.

In step SB40 CPU 201 stores the received file to hard disk 204 and proceeds to step SB50.

In step SB50 CPU 201 edits the received file in accordance with information received from the user and proceeds to step SB60.

In step SB60 CPU 201 outputs a request to MFP 100 to print the edited file, as required. Note that CPU 201 outputs the request in response to the user having input corresponding information. Note that if printing a file is requested, (the image data corresponding to) the file to be printed is transmitted together with location information and/or the like information added at step SA30.

In the process shown in FIG. 10 CPU 101 determines in step SC10 whether the request to print the file has been received from PC 200. If so CPU 101 proceeds to step SC20.

In step SC20 CPU 101 extracts the authentication information, the attribute information and the location information from the received print request and proceeds to step SC30.

In step SC30 CPU 101 causes printer 107 to effect a process to print the file to be printed, and proceeds to step SC40.

In step SC40 CPU 101 stores the file to be printed to hard disk 104 or RAM 103 and proceeds to step SC50.

In step SC50 CPU 101 accesses printer 107 to determine whether the file to be printed has completely been printed, and if so CPU 101 proceeds to step SC60.

In step SC60 CPU 101 refers to the attribute information extracted at step SC20 to determine whether the file to be printed has an attribute including information indicating that the file is a shared file (i.e., information indicating that sharing is permitted). If so, CPU 101 proceeds to step SC70. Otherwise CPU 101 then terminates the process.

In step SC70 CPU 101 outputs a request, as based on the location information extracted at step SC20, to file server 300 to transmit the master file, and proceeds to step SC80. Note that when CPU 101 does so, CPU 101 also outputs to file server 300 the authentication information extracted at step SC20.

With reference again to FIG. 8, CPU 301 determines in step SA50 whether the request issued from MFP 100 to transmit the file has been received. If so CPU 301 proceeds to step SA60, otherwise CPU 301 proceeds to step SA80.

In step SA60 CPU 301 determines whether, together the request to transmit the file, the authentication information has also been received, and if so then CPU 301 determines whether the user is an authorized user, as has been described above for step SA20, and if so then CPU 301 proceeds to step SA70. If a decision that the authentication information has not been received together with the request or a decision that the user is an unauthorized user is made, CPU 301 proceeds to step SA80. Note that in step SA60 CPU 301 for example compares the received authentication information with that registered in a database previously stored for example on hard disk 304, and if they match, CPU 301 determines that the user of interest is an authorized user.

In step SA70 CPU 301 transmits to MFP 100 the master file requested in the request to transmit the file, and proceeds to step SA80.

With reference to FIG. 10, CPU 101 determines in step SC80 whether the master file has been received, and if so CPU 101 proceeds to step SC90.

With reference to FIG. 11, in step SC90 CPU 101 compares the master file with the file to be printed and proceeds to step SC100. This comparison may be made by employing typical techniques. For example, as disclosed in Japanese Laid-Open Patent Publication No. 2005-223863, it may be done by extracting a difference between both image data or coding both files and comparing the coded data.

In step SC100 CPU 101 determines from a result of the comparison whether the file to be printed has been updated as compared with the master file, and if so CPU 101 proceeds to step SC110, otherwise CPU 101 then terminates the process.

In step SC110 CPU 101 notifies the user having transmitted the request to print the file that the file has completely been printed, and also issues notification to inquire whether the master file may be updated, and proceeds to step SC20.

In step SC110 the notification specifically transmits information providing such notification to PC 200 having transmitted the request to print the file.

With reference to FIG. 9, CPU 201 determines in step SB70 whether such notification has been received from MFP 100, and if so CPU 201 proceeds to step SB80.

Figure 12:
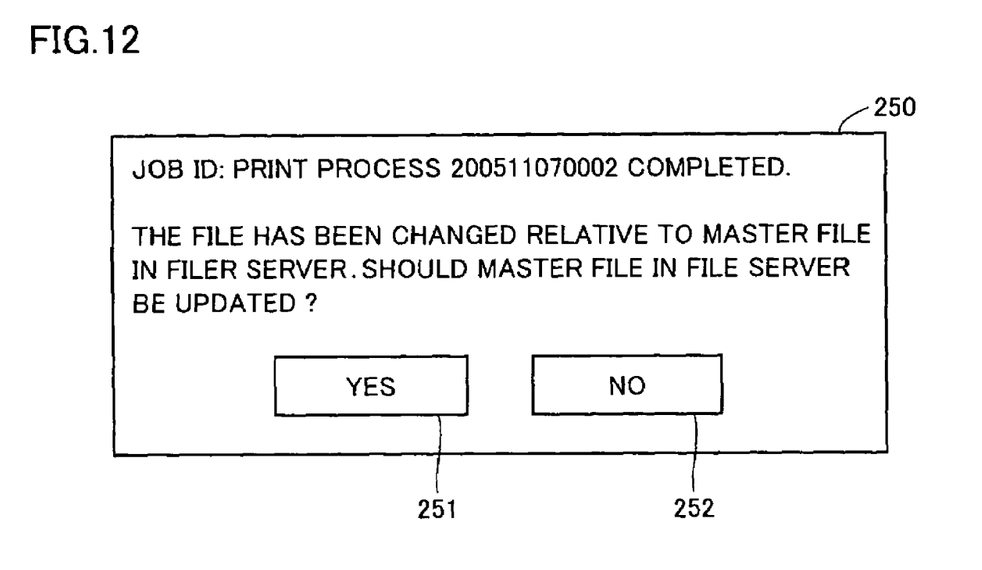
FIG. 12 shows one example of a screen displayed on a display of the PC of FIG. 1.

As such information is received, CPU 201 for example causes display 205 to display a screen such as a screen 250 shown in FIG. 12, and awaits information input from the user indicating whether updating is permitted.

With reference to FIG. 12, screen 250 displays a message indicating that a printing process has completed and, together therewith, a message inquiring of the user whether the master file may be updated or not. Furthermore, screen 250 displays a YES button 251 operated by the user to permit updating, and a NO button 252 operated by the user to prohibit updating. The user operates either button and in response CPU 201 determines that information of whether the master file may be updated or not has been received from the user.

Then CPU 201 operates in step SB80 in accordance with the received information to transmit information to MFP 100 to permit or prohibit updating the master file.

With reference to FIG. 11, CPU 101 determines in step SC120 whether the information received from PC 200 is information that permits updating. If so CPU 101 proceeds to step SC130, otherwise CPU 101 terminates the process.

In step SC130 CPU 101 transmits to file server 300 the file to be printed and a request to update the master file, and ends the process. In doing so, the authentication information extracted at step SC20 is also output to file server 300.

CPU 301 determines in step SA80 whether the request to update the master file has been received from MFP 100, and if so CPU 301 proceeds to step SA90, otherwise CPU 301 terminates the process.

In step SA90 CPU 301 determines whether, together with the request to update the master file, the authentication information has also been received, and if so, then, as has been described above for step SA20, CPU 301 determines whether the user of interest is an authorized user, and if so then CPU 301 proceeds to step SA100. If the authentication information is not received together with the request or the user of interest is an unauthorized user, then CPU 301 terminates the process.

In step SA100 CPU 301 updates the master file to be identical in content to the file to be printed, and ends the process.

In the above described, present embodiment, as performed in step SC130, MFP 100 transmits a request for updating or similar information to file server 300 to configure a process performed by MFP 100 for updating a file on a file server.

Note that in the above described, present embodiment, a master file and a file to be printed are compared with each other in content, and if the file to be printed is an updated version of the master file, i.e., if the files are different in content, the master file is updated. This allows the master file to be updated only when required, contributing to a more effectively reduced burden on a file server. Note that in the present invention, updating is not limited thereto. For example, updating may be done without comparing contents, i.e., regardless of difference in content.

Furthermore, in the above described, present embodiment, if attribute information of a master file (and/or a file to be printed) include(s) information indicating that it is/they are a shared file or files, the master file is updated. This can prevent updating a file unintended to be updated in a file server. Note that in the present invention, updating a master file is not limited thereto. The master file may be updated regardless of its attribute(s) and/or those of other files.

Furthermore, in the above described, present embodiment, before a master file is updated, notification is provided to a PC used by a user to output a request to print file, and the master file is updated if the user permits doing so. This allows the master file to be updated with the user's intention reflected therein. Note that in the present invention the master file may be updated without the necessity of obtaining the user's permission.

Furthermore, in the above described, present embodiment, the image processor has been described, by way of example, as an MFP that receives a request to print a file and furthermore performs a printing process. The present image processor is, however, not required to necessarily also performs the printing process. Any image processor that can receive a request to print a file suffices and, for example, it may be a print server.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processor connected to a file server and a local computer through a network, comprising:
   a receiver receiving a print request issued to print a file from the local computer;
   a printer configured to print the file;
   a reader obtaining location information specifying a location of a master file corresponding to the file for which the print request is issued when the print request is received by said receiver;
   an accessor accessing the master file stored in the file server; and
   an updater operating in response to the print request to perform a process to update the master file in the file server utilizing the file for which the print request is issued.

2. The image processor according to claim 1, wherein:
   said receiver receives, together with the print request issued to print the file, authentication information on the file for which the print request is issued;
   said updater transmits, to said file server, said authentication information on the file for which the print request is issued in performing said process to update the file; and
   said authentication information is compared and as a result if a decision is made that said authentication information satisfies a predetermined condition, said file server updates the master file.

3. The image processor according to claim 1, further comprising a comparator comparing in content a file accessed by said accessor with the file for which the print request is issued that is received by said receiver, wherein said updater performs said process to update the file if said comparator determines that the files are different in content.

4. The image processor according to claim 1, wherein if the file corresponding to said location information includes information permitting sharing with another terminal, said updater performs said process to update the file.

5. The image processor according to claim 4, wherein said updater determines, as based on attribute information of the file for which the print request is issued that is received by said receiver, whether the file corresponding to said location information includes the information permitting sharing with another terminal.

6. The image processor according to claim 1, further comprising an information transmitter transmitting, to a terminal from which the print request received by said receiver originates, information asking for an indication of whether updating a file stored in said file server is permitted; wherein if said terminal from which the print request received by said receiver originates transmits an indication to permit updating the file stored in said file server, said updater performs said process to update the file.

7. A computer readable medium comprising a program product for controlling an image processor connected to a file server and a local computer through a network, said program product causing said image processor to perform;
   receiving a print request issued to print a file from the local computer;
   printing the file;
   obtaining location information specifying a location of a master file corresponding to the file for which the print request is issued when the print request is received in the receiving step;
   accessing the master file stored in the file server; and
   updating in response to the print request the master file in the file server utilizing the file for which the print request is issued.

8. The computer-readable medium of comprising a program product according to claim 7, wherein:
   in the step of receiving, together with the print request issued to print the file, authentication information on the file for which the print request is issued is received;

in the step of updating, said authentication information on the file for which the print request is issued in performing said process to update the file is transmitted to said file server; and said authentication information is compared and as a result if a decision is made that said authentication information satisfies a predetermined condition, said file server updates the master file.

9. The computer-readable medium of comprising a program product according to claim 7, further causing said image processor to perform the step of comparing in content a file accessed in the step of accessing with the file for which the print request is issued that is received in the step of receiving, wherein in the step of updating, said process to update the file is performed if a decision is made in the step of comparing that the files are different in content.

10. The computer-readable medium of comprising a program product according to claim 7, wherein in the step of updating, if the file corresponding to said location information includes information permitting sharing with another terminal, said process to update the file is performed.

11. The computer-readable medium of comprising a program product according to claim 10, wherein in the step of updating, whether the file corresponding to said location information includes the information permitting sharing with another terminal is determined as based on attribute information of the file for which the print request is issued that is received in the step of updating.

12. The computer-readable medium of comprising a program product according to claim 7, further causing said image processor to perform the step of transmitting, to a terminal from which the print request received in the step of receiving originates, information asking for an indication of whether updating a file stored in said file server is permitted, wherein in the step of updating, if said terminal from which the print request received in the step of receiving originates transmits an indication to permit updating the file stored in said file server, said process to update the file is performed.

13. A method of controlling an image processor connected to a file server and a local computer through a network, comprising:

receiving a print request issued to print a file from the local computer;

printing the file;

obtaining location information specifying a location of a master file corresponding to the file for which the print request is issued when the print request is received in the receiving step;

accessing the master file stored in the file server; and updating in response to the print request the master file in the file server utilizing the file for which the print request is issued.

14. The method according to claim 13, further comprising the step of comparing in content a file accessed in the step of accessing with the file for which the print request is issued that is received in the step of receiving, wherein in the step of updating, said process to update the file is performed if a decision is made in the step of comparing that the files are different in content.

15. The method according to claim 13, wherein in the step of updating, if the file corresponding to said location information includes information permitting sharing with another terminal, said process to update the file is performed.

16. The method according to claim 15, wherein in the step of updating, whether the file corresponding to said location information includes the information permitting sharing with another terminal is determined as based on attribute information of the file for which the print request is issued that is received in the step of updating.

17. The method according to claim 13, further comprising the step of transmitting, to a terminal from which the print request received in the step of receiving originates, information asking for an indication of whether updating a file stored in said file server is permitted, wherein in the step of updating, if said terminal from which the print request received in the step of receiving originates transmits an indication to permit updating the file stored in said file server, said process to update the file is performed.

* * * * *